(12) United States Patent
Pereira et al.

(10) Patent No.: US 7,612,869 B2
(45) Date of Patent: Nov. 3, 2009

(54) APERTURE CODED CAMERA FOR THREE DIMENSIONAL IMAGING

(75) Inventors: Francisco Pereira, Pasadena, CA (US); Darius Modarress, Rancho Palos Verdes, CA (US); Mory Gharib, San Marino, CA (US); Dana Dabiri, Altadena, CA (US); David Jeon, Los Angeles, CA (US)

(73) Assignee: California Institute Of Technology, Pasadena, CA (US)

( * ) Notice: Subject to any disclaimer, the term of this patent is extended or adjusted under 35 U.S.C. 154(b) by 347 days.

(21) Appl. No.: 11/365,970

(22) Filed: Feb. 28, 2006

(65) Prior Publication Data

US 2006/0209193 A1    Sep. 21, 2006

Related U.S. Application Data

(63) Continuation of application No. 09/935,215, filed on Aug. 21, 2001, now Pat. No. 7,006,132, which is a continuation-in-part of application No. 09/258,160, filed on Feb. 25, 1999, now Pat. No. 6,278,847.

(60) Provisional application No. 60/078,750, filed on Feb. 25, 1998.

(51) Int. Cl.
*G01C 3/08* (2006.01)
*H04N 9/09* (2006.01)

(52) U.S. Cl. ............... 356/3.13; 356/141.5; 348/262

(58) Field of Classification Search ............... 356/28, 356/3.01–5.15, 139.01–141.5; 348/262, 348/335
See application file for complete search history.

(56) References Cited

U.S. PATENT DOCUMENTS 3,589,815 A    6/1971    Hosterman (Continued)

FOREIGN PATENT DOCUMENTS

DE    198 36 886    3/2000

(Continued)

OTHER PUBLICATIONS

Adamczyk & Ramai "Reconstruction of a 3-Dimensional Flow Field" Experiments in Fluids, 6, pp. 380-386 (1988).

(Continued)

*Primary Examiner*—Isam Alsomiri
(74) *Attorney, Agent, or Firm*—Patterson, Thuente, Skaar & Christensen, P.A.

(57) ABSTRACT

A system and method for determining instantaneously the three-dimensional coordinates of large sets of points in space is disclosed. This system uses two or more CCD cameras (or any other type of camera), each with its own lens and pinhole. The CCD's are all arranged so that the pixel arrays are within the same plane. The CCD's are also arranged in a predefined pattern. The combination of the multiple images acquired from the CCD's onto one single image forms a pattern, which is dictated by the predefined arrangement of the CCD's. The size and centroid on the combined image are a direct measure of the depth location Z and in-plane position (X,Y), respectively. The use of a predefined pattern enables high speed computation through simple algorithmic procedures. Moreover, the use of CCD cameras allows for the recording of such datasets at the corresponding image frame rate, thus opening the use of the invention to the mapping of dynamical systems.

36 Claims, 13 Drawing Sheets

U.S. PATENT DOCUMENTS

| | | | |
|---|---|---|---|
| 3,625,618 A | 12/1971 | Bickel | |
| 4,247,177 A | 1/1981 | Marks et al. | |
| 4,299,491 A | 11/1981 | Waters et al. | |
| 4,375,921 A | 3/1983 | Morander | |
| 4,473,750 A | 9/1984 | Oshida et al. | |
| 4,494,874 A | 1/1985 | DiMatteo et al. | |
| 4,532,723 A | 8/1985 | Kellie et al. | |
| 4,594,001 A | 6/1986 | DiMatteo et al. | |
| 4,645,347 A * | 2/1987 | Rioux | 356/609 |
| 4,729,109 A | 3/1988 | Adrian et al. | |
| 4,764,016 A | 8/1988 | Johansson | |
| 4,830,485 A | 5/1989 | Penney et al. | |
| 4,919,536 A | 4/1990 | Komine | |
| 4,935,635 A | 6/1990 | O'Harra | |
| 4,979,815 A | 12/1990 | Tsikos | |
| 4,983,043 A | 1/1991 | Harding | |
| 4,988,191 A | 1/1991 | Adrian et al. | |
| 5,018,854 A | 5/1991 | Rioux | |
| 5,075,561 A | 12/1991 | Rioux | |
| 5,110,204 A | 5/1992 | Miles et al. | |
| 5,168,327 A * | 12/1992 | Yamawaki | 356/609 |
| 5,189,493 A | 2/1993 | Harding | |
| 5,270,795 A * | 12/1993 | Blais | 356/609 |
| 5,294,971 A | 3/1994 | Braunecker et al. | |
| 5,333,044 A | 7/1994 | Shaffer | |
| 5,367,378 A | 11/1994 | Harding et al. | |
| 5,440,144 A | 8/1995 | Raffel et al. | |
| 5,491,642 A | 2/1996 | Wormell et al. | |
| 5,500,737 A | 3/1996 | Donaldson et al. | |
| 5,548,419 A | 8/1996 | Adrian et al. | |
| 5,565,914 A | 10/1996 | Motta | |
| 5,568,263 A | 10/1996 | Hanna | |
| 5,581,383 A | 12/1996 | Reichel et al. | |
| 5,610,703 A | 3/1997 | Raffel et al. | |
| 5,646,733 A | 7/1997 | Bieman | |
| 5,661,667 A | 8/1997 | Rueb et al. | |
| 5,675,407 A | 10/1997 | Geng | |
| 5,850,485 A | 12/1998 | Hart | |
| 5,905,568 A | 5/1999 | McDowell et al. | |
| 5,990,934 A | 11/1999 | Nalwa | |
| 6,108,458 A | 8/2000 | Hart | |
| 6,124,990 A | 9/2000 | Suzuki | |
| 6,252,623 B1 | 6/2001 | Lu et al. | |
| 6,278,847 B1 | 8/2001 | Gharib et al. | |
| 6,353,227 B1 | 3/2002 | Boxen | |
| 6,603,535 B1 * | 8/2003 | McDowell | 356/28 |
| 6,674,463 B1 * | 1/2004 | Just et al. | 348/43 |
| 6,737,652 B2 | 5/2004 | Lanza et al. | |
| 7,006,132 B2 | 2/2006 | Pereira et al. | |
| 2002/0149691 A1 | 10/2002 | Pereira et al. | |

FOREIGN PATENT DOCUMENTS

| | | |
|---|---|---|
| EP | 0 631 250 | 12/1994 |
| WO | WO99/44096 | 9/1999 |

OTHER PUBLICATIONS

Eklins et al. "Evaluation of Stereoscopic Trace Particle Records of Turbulent flow Fields" Review of Scientific Instruments, vol. 48, No. 7, pp. 738-746 (1977).

Guezennec, et al. "Algorithms for Fully Automated Three Dimensional Tracking Velocimetry", Experiments in Fluids, 4 (1993).

Willert, C.E., et al., "Three-dimensional particle imaging with a single camera", *Experiments in Fluids,* 12(6):353-358, Apr. 1992.

* cited by examiner

APERTURE CODED CAMERA FOR THREE DIMENSIONAL IMAGING

CROSS REFERENCE TO RELATED APPLICATIONS

This application is a continuation of U.S. application Ser. No. 09/935,215, filed Aug. 21, 2001 now U.S. Pat. No. 7,006,132, which is a continuation-in-part of U.S. application Ser. No. 09/258,160, filed Feb. 25, 1999, now U.S. Pat. No. 6,278,847, which claims the benefit of U.S. provisional application Ser. No. 60/078,750, filed Feb. 25, 1998.

STATEMENT AS TO FEDERALLY SPONSORED RESEARCH

The U.S. Government may have certain rights in this invention pursuant to Grant No. N00014-97-1-0303 awarded by the U.S. Navy.

BACKGROUND

Different techniques are known for three dimensional imaging.

It is known to carry out three dimensional particle imaging with a single camera. This is also called quantative volume imaging. One technique, described by Willert and Gharib uses a special defocusing mask relative to the camera lens. This mask is used to generate multiple images from each scattering site on the item to be imaged. This site can include particles, bubbles or any other optically-identifiable image feature. The images are then focused onto an image sensor e.g. a charge coupled device, CCD. This system allows accurately, three dimensionally determining the position and size of the scattering centers.

Another technique is called aperture coded imaging. This technique uses off-axis apertures to measure the depth and location of a scattering site. The shifts in the images caused by these off-axis apertures are monitored, to determine the three-dimensional position of the site or sites.

There are often tradeoffs in aperture coding systems.

FIG. 1A shows a large aperture or small f stop is used. This obtains more light from the scene, but leads to a small depth of field. The small depth of field can lead to blurring of the image. A smaller F stop increases the depth of field as shown in FIG. 1B. Less image blurring would therefore be expected. However, less light is obtained.

FIG. 1C shows shifting the apertures off the axis. This results in proportional shifts on the image plane for defocused objects.

The FIG. 1C system recovers, the three dimensional spatial data by measuring the separation between images related to off-axis apertures b, to recover the "z" component of the images. The location of the similar image set is used find the in-plane components x and y.

Systems have been developed and patented to measure two-component velocities within a plane. Examples of such systems include U.S. Pat. Nos. 5,581,383, 5,850,485, 6,108,458, 4,988,191, 5,110,204, 5,333,044, 4,729,109, 4,919,536, 5,491,642. However, there is a need for accurately measuring three-component velocities within a three-dimensional volume. Prior art has produced velocimetry inventions, which produce three-component velocities within a two-dimensional plane. These methods are typically referred to as stereo imaging velocimetry, or stereoscopic velocimetry. Many such techniques and methods have been published, i.e. Eklins et al. "Evaluation of Stereoscopic Trace Particle Records of Turbulent flow Fields" Review of Scientific Instruments, vol. 48, No. 7, 738-746 (1977); Adamczyk & Ramai "Reconstruction of a 3-Dimensional Flow Field" Experiments in Fluids, 6, 380-386 (1988); Guezennec, et al. "Algorithms for Fully Automated Three Dimensional Tracking Velocimetry", Experiments in Fluids, 4 (1993).

Several stereoscopic systems have also been patented. Raffel et al., under two patents, U.S. Pat. Nos. 5,440,144 and 5,610,703 have described PIV (Particle Image Velocimetry) systems for measuring three-component velocities within a two-dimensional plane. U.S. Pat. No. 5,440,144 describes an apparatus using 2 cameras, while U.S. Pat. No. 5,610,703 describes an apparatus and method using only one camera to obtain the three-component velocity data. U.S. Pat. No. 5,905,568 describes a stereo imaging velocimetry apparatus and method, using off-the-shelf hardware, that provides three-dimensional flow analysis for optically transparent fluid seeded with tracer particles.

Most recently, a velocimetry system that measures three-component velocities within a three-dimensional volume has been patented under U.S. Pat. No. 5,548,419. This system is based upon recording the flow on a single recording plate by using double exposure, double-reference-beam, and off-axis holography. This system captures one velocity field in time, thereby preventing acquisition through time, and analysis of time evolving flows.

There therefore still exists a need for a system and method by which accurate three-component velocities can be obtain within a three-dimensional volume using state-of-the-art analysis for any optically transparent fluids seeded with tracer particles.

Three-Dimensional Profilometry is another technique, often used for measuring the three-dimensional coordinate information of objects: for applications in speeding up product development, manufacturing quality control, reverse engineering, dynamical analysis of stresses and strains, vibration measurements, automatic on-line inspection, etc. Furthermore, new fields of application, such as computer animation for the movies and game markets, virtual reality, crowd or traffic monitoring, biodynamics, etc, demand accurate three-dimensional measurements. Various techniques exist and some are now at the point of being commercialized. The following patents describe various types of three-dimensional imaging systems:

U.S. Pat. No. 3,589,815 to Hosterman, Jun. 29, 1971;
U.S. Pat. No. 3,625,618 to Bickel, Dec. 7, 1971;
U.S. Pat. No. 4,247,177 to Marks et al, Jan. 27, 1981;
U.S. Pat. No. 4,299,491 to Thornton et al, Nov. 10, 1981;
U.S. Pat. No. 4,375,921 to Morander, Mar. 8, 1983;
U.S. Pat. No. 4,473,750 to Isoda et al, Sep. 25, 1984;
U.S. Pat. No. 4,494,874 to DiMatteo et al, Jan. 22, 1985;
U.S. Pat. No. 4,532,723 to Kellie et al, Aug. 6, 1985;
U.S. Pat. No. 4,594,001 to DiMatteo et al, Jun. 10, 1986;
U.S. Pat. No. 4,764,016 to Johansson, Aug. 16, 1988;
U.S. Pat. No. 4,935,635 to O'Harra, Jun. 19, 1990;
U.S. Pat. No. 4,979,815 to Tsikos, Dec. 25, 1990;
U.S. Pat. No. 4,983,043 to Harding, Jan. 8, 1991;
U.S. Pat. No. 5,189,493 to Harding, Feb. 23, 1993;
U.S. Pat. No. 5,367,378 to Boehnlein et al, Nov. 22, 1994;
U.S. Pat. No. 5,500,737 to Donaldson et al, Mar. 19, 1996;
U.S. Pat. No. 5,568,263 to Hanna, Oct. 22, 1996;
U.S. Pat. No. 5,646,733 to Bieman, Jul. 8, 1997;
U.S. Pat. No. 5,661,667 to Bordignon et al, Aug. 26, 1997; and
U.S. Pat. No. 5,675,407 to Geng, Oct. 7, 1997.
U.S. Pat. No. 6,252,623 to Lu, Jun. 26, 2001.

If contact methods are still a standard for a range of industrial applications, they are condemned to disappear: as the present challenge is on non-contact techniques. Also, contact-based systems are not suitable for use with moving and/or deformable objects, which is the major achievement of the present method. In the non-contact category, optical measurement techniques are the most widely used and they are constantly updated, in terms of both of concept and of processing. This progress is, for obvious reasons, parallel to the evolution observed in computer technologies, coupled with the development of high performance digital imaging devices, electro-optical components, lasers and other light sources.

The following briefly describe techniques:

The time-of-flight method is based on the direct measurement of the time of flight of a laser or other light source pulse, e.g. the time between its emission and the reception time of the back reflected light. A typical resolution is about one millimeter. Light-in-flight holography is another variant where the propagating optical wavefront is regenerated for high spatial resolution interrogation: sub-millimeter resolution has been reported at distances of 1 meter. For a surface, such technique would require the scanning of the surface, which of course is incompatible with the measurement of moving objects.

Laser scanning techniques are among the most widely used. They are based on point laser triangulation, achieving accuracy of about 1 part in 10000. Scanning speed and the quality of the surface are the main factors against the measurement accuracy and system performance.

The Moiré method is based on the use of two gratings, one is a reference (i.e. undistorted) grating, and the other one is a master grating. The typical measurement resolution is $1/10$ to $1/100$ of a fringe in a distance range of 1 to 500 mm.

Interferometric shape measurement is a high accuracy technique capable of 0.1 mm resolution with 100 m range, using double heterodyne interferometry by frequency shift. Accuracies $1/100$ to $1/1000$ of fringe are common. Variants are under development: shearography, diffraction grating, wavefront reconstruction, wavelength scanning, conoscopic holography.

Moiré and interferometer based systems provide a high measurement accuracy. Both, however, may suffer from an inherent conceptual drawback, which limits depth accuracy and resolution for surfaces presenting strong irregularities. In order to increase the spatial resolution, one must either use shift gratings or use light sources with different wavelengths. Three to four such shifts are necessary to resolve this limitation and obtain the required depth accuracy. This makes these techniques unsuitable for time-dependent object motion. Attempts have been made with three-color gratings to perform the Moiré operation without the need for grating shift. However, such attempts have been unsuccessful in resolving another problem typical to fringe measurement systems: the cross-talk between the color bands. Even though some systems deliberately separate the bands by opaque areas to solve this problem, this is done at the expense of a much lower spatial resolution.

Laser radar 3D imaging, also known as laser speckle pattern sampling, is achieved by utilizing the principle that the optical field in the detection plane corresponds to a 2D slice of the object's 3D Fourier transform. Different slices can be obtained by shifting the laser wavelength. When a reference plane is used, this method is similar to two-wavelength or multi-wavelength speckle interferometry. The measurement range goes from a micrometer to a few meters. Micrometer resolutions are attained in the range of 10 millimeters.

Photogrammetry uses the stereo principle to measure 3D shape and requires the use of bright markers, either in the form of dots on the surface to be measured of by projection of a dot pattern. Multiple cameras are necessary to achieve high accuracy and a calibration procedure needs to be performed to determine the imaging parameters of each of them. Extensive research has been done on this area and accuracies in the order of one part in 100000 are being achieved. Precise and robust calibration procedures are available, making the technique relatively easy to implement.

Laser trackers use an interferometer to measure distances, and two high accuracy angle encoders to determine vertical and horizontal encoders. There exist commercial systems providing accuracies of +/−100 micrometers within a 35-meter radius volume.

Structured light method is a variant of the triangulation techniques. Dots or lines or projected onto the surface and their deformed pattern is recorded and directly decoded. One part over 20000 has been reported.

Focusing techniques that have received a lot of attention because of their use in modern photographic cameras for rapid autofocusing. Names like depth-from-focus and shape-from-focus have been reported. These techniques may have unacceptably low accuracy and the time needed to scan any given volume with sufficient resolution have confined their use to very low requirement applications.

Laser trackers, laser scanning, structured light and time-of-flight methods require a sweeping of the surface by the interrogation light beam. Such a scanning significantly increases the measuring period. It also requires expensive scanning instruments. The Moiré technique requires very high resolution imaging devices to attain acceptable measurement accuracy. Laser speckle pattern sampling and interferometric techniques are difficult and expensive to implement. For large-scale measurements, they require also more time to acquire the image if one wants to take advantage of the wavelength shifting method. Photogrammetry needs a field calibration for every configuration. Furthermore, the highest accuracy is obtained for large angular separations between the cameras, thus increasing the shading problem.

There is thus a widely recognized need for a method and system to rapidly, accurately and easily extract the surface coordinate information of as large as possible number of designated features of the scene under observation, whether these features are stationary, in motion, and deforming. The technique should be versatile enough to cover any range of measurement, and with accuracy comparable to or surpassing that of systems available today. The technique should allow for fast processing speeds. Finally, the technique should be easy to implement for the purpose of low cost manufacturing. As we will describe, the present invention provides a unique alternative since it successfully addresses these shortcomings, inherent partially or totally to the presently know techniques.

SUMMARY

The present system caries out aperture-induced three dimensional measuring by obtaining each image through each aperture. A complete image detector is used to obtain the entire image. The complete image detector can be a separate camera associated with each aperture, or a single camera that is used to acquire the different images from the different apertures one at a time.

The optical train is preferably arranged such that the aperture coded mask causes the volume to be imaged through the defocusing region of the camera lens. Hence, the plane of focus can be, and is intentionally outside of, the volume of interest. An aperture coded mask which has multiple openings of predefined shape, not all of which are necessarily the same geometry, and is off the lens axis, is used to generate multiple images. The variation and spacing of the multiple images provides depth information. Planar motion provides information in directions that are perpendicular to the depth. In addition, the capability to expose each of the multiple images onto a separate camera portion allows imaging of high density images but also allows proper processing of those images.

BRIEF DESCRIPTION OF THE DRAWINGS

These and other aspects will now be described in detail with the accompanying drawings, wherein.

DESCRIPTION OF THE PREFERRED EMBODIMENT

Figure 1A:
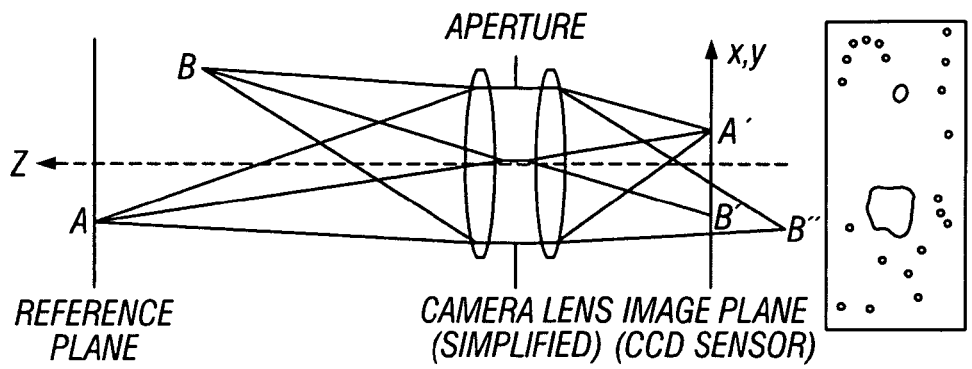
FIGS. 1A-1C show views of different systems for 3 dimensional imaging.
Figure 1B:
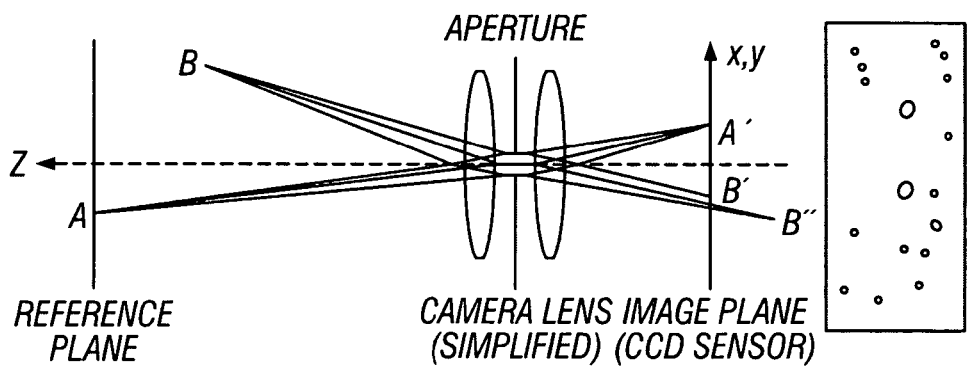
Figure 1C:
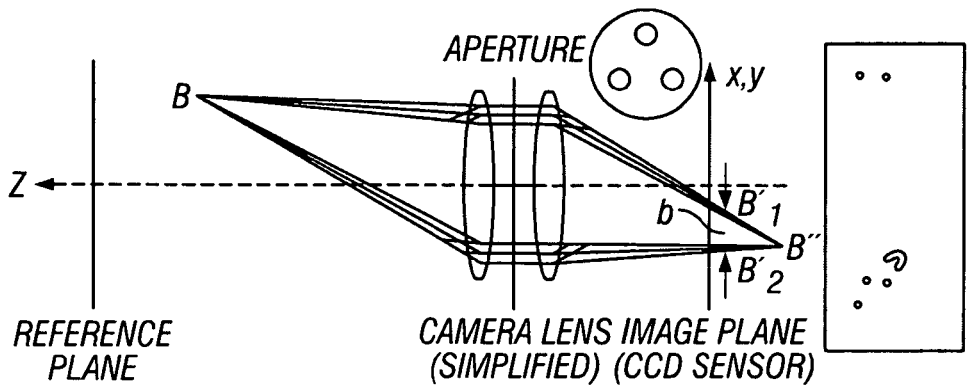
Figure 2:
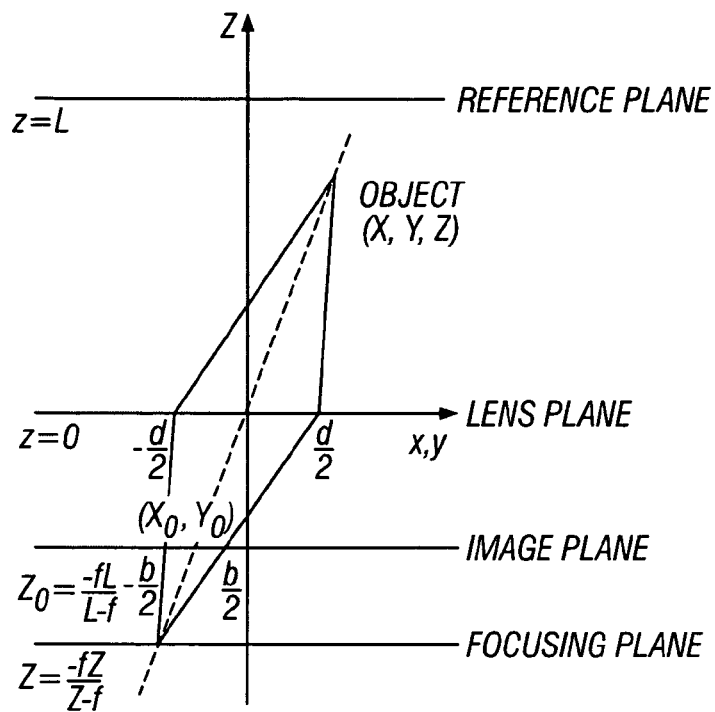
FIG. 2 shows a geometric analysis of a specified lens aperture system.

FIG. 2 shows a geometric analysis in which a camera lens of focal length F is located at z=0. Two small apertures are placed within the lens, separated a distance d/2 away from the optical centerline 200 which also corresponds to the z axis. The apertures are shown as pinholes in this diagram to simplify the model. The theory for larger and more complex apertures would be similar.

The following equations can be determined by using lens laws and self similar triangle analysis:

$$Z = 1/((1/L) + Kb) \quad (1)$$

where $$K = (L-f)/(fdL) \quad (2)$$

The remaining two coordinates x, y are found from the geometrical center $(X_0, Y_0)$ of the image pair B' using:

$$X = (-x_0 Z(L-f))/(fL) \quad (3)$$

$$Y = (-y_0 Z(L-f))/(fL) \quad (4)$$

Solving (1) for the image separation b reveals several interesting performance characteristics of the lens/aperture system:

$$b = 1/K((1/Z) - (1/L)) \quad (5)$$

The inventors recognized that if all this information was obtained by a single camera, an image crowding problem could exist. This would limit the system to a lower density of number of images.

The defocusing masses requires multiple spatially-shaped holes. If there are n holes, then each scattering site has been imaged n times onto a single CCD. Hence, n times as many pixels are exposed. This means, however, that the capacity of the technique, i.e. the number of scattering sites that can be imaged, is correspondingly reduced by a factor of n.

The present system addresses this and other issues.

A first aspect addresses the image crowding problem by exposing each of the multiple exposures using a separate camera portion. The camera system can be electronic or photographic based. The separate camera portion requires that a whole camera imaging portion is used to obtain the images from each aperture at each time. This can use multiple separate cameras, a single camera with multiple parts, or a single camera used to obtain multiple exposures at different times.

Another aspect obtains image information about the objects at a defocused image plane, i.e. one which is not in focus by the lens. Since the image plane is intentionally out of focus, there is less tradeoff regarding depth of field.

The first embodiment, as described above, uses image separation to expose each of the multiple exposures to its own electronic or photographic camera portion. The image separation can be effected by color filters, by time coding, by spacial filters, or by using multiple independent cameras.

Figure 3:
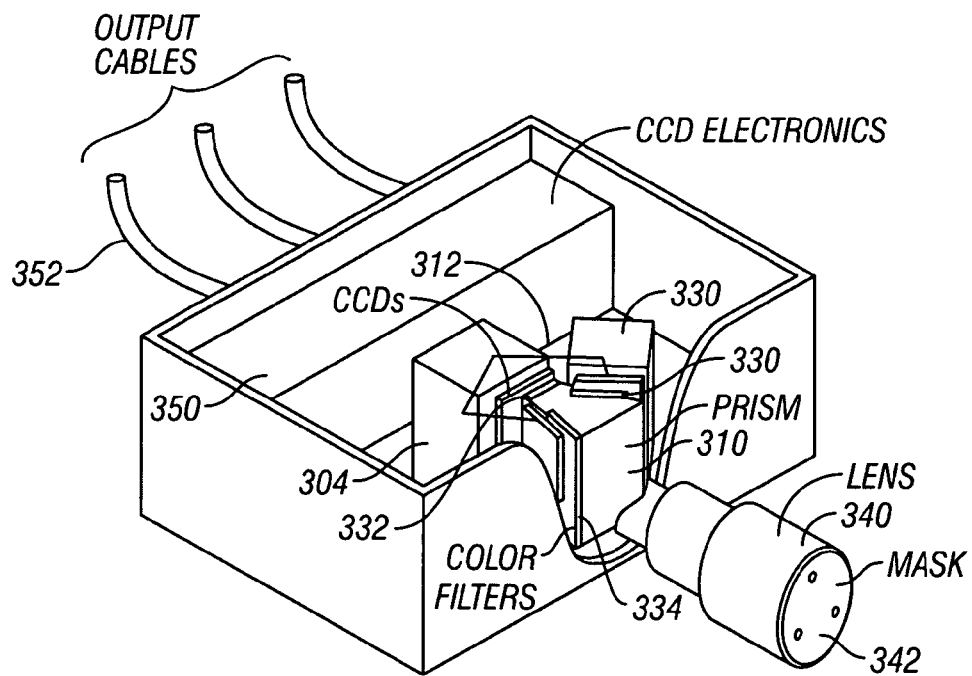
FIG. 3 shows a camera diagram with camera components.

The color filter embodiment is shown in FIG. 3. A color camera and mask combination is shown with three separate CCD cameras 300, 302, 304.

Light is input through mask 342, which includes an opaque aperture plate with three apertures formed therein. In this embodiment, the apertures are generally in the shape of a triangle. The light passes to a lens assembly 346, which directs the light into the chamber that houses the camera.

The color camera uses three monochrome CCD cameras, situated around a three way prism 310 which separates the incoming light according to its colors. A micro positioner assembly 312 is provided to precisely adjust the cameras 300, 302, 304 such that each will view exactly the same area. Once those adjustments are made, the three cameras are locked into place so that any vibration affects each of them the same. Each camera includes an associated band filter. The filter 330 is associated with CCD camera 300, filter 332 is associated with camera 302, and filter 334 is associated with camera 304. Each of these narrow band filters passes only one of the colors that is passed by the coded apertures. The filters are placed adjacent the prism output to correspond respectively to each of the primary colors, e.g. red, green and blue. Hence, the filters enable separating the different colors.

This color camera assembly is used in conjunction with an image lens assembly 340 and a aperture coded mask 342. The system in FIG. 3 shows the aperture coded mask having three mask portions in the form of an equilateral triangle. Each aperture is color coded according to the colors of the camera filters. This color coding can be done by, for example, using color filters on the apertures.

The image from each aperture goes to a separate one of the cameras 302, 304, 300. The output from the camera is processed by the CCD electronics 350 and coupled to output cables shown as 352. These three values are processed using a conventional processing software. The three values can be compensated separately.

While the system describes using three colors and three apertures, it should be understood that any number of colors or apertures could be provided.

Figure 4A:
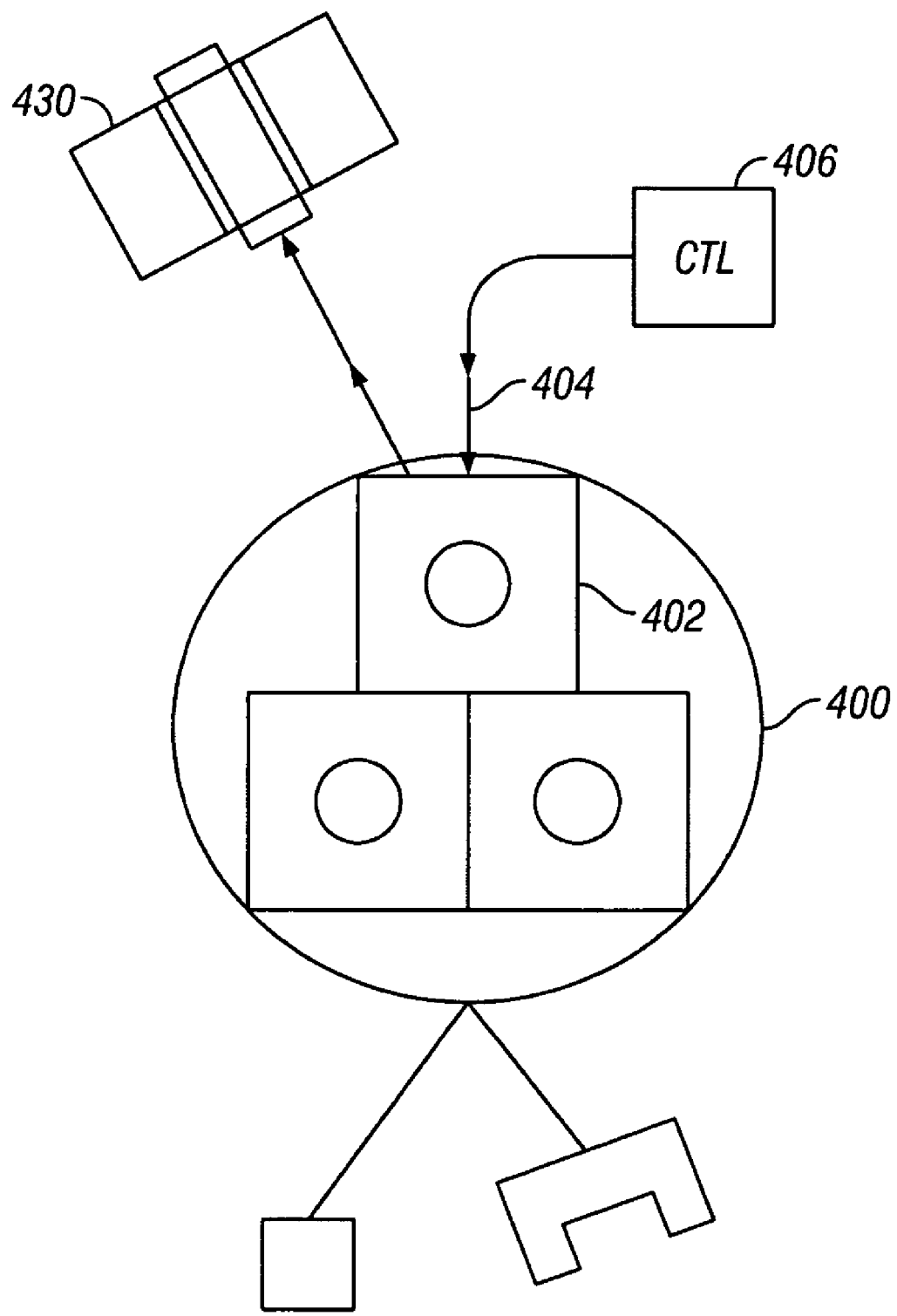
FIG. 4A shows a drawing of the preferred camera.

A second embodiment separates the images from the different apertures using rapid sequential imaging. An embodiment is shown in FIG. 4A. A scene is imaged through a mask 400 that includes multiple apertures. Each aperture has an associated selective blocking means 402. The blocking means is a device that either allows light to pass through the aperture or blocks light from passing through the aperture under control of an applied control signal 404 from a control element 400. The aperture blocking means 402 can be a mechanical blocker e.g. a mechanical shutter, solid state optics, such as a liquid crystal which is selectively allowed to pass light, or a digital mirror which selectively reflects the light to the aperture or the like. Light from the scattering sites 410 is allowed to pass through each aperture at a separate time, under control of the controller 406. The passed light is sent to a single camera 430 that produces an image indicative of the passed light. Three different images are obtained at three different times. Each image is based on passage of the light through a different aperture.

Alternate ways of obtaining the three images could be used. A purely mechanical means can be provided to pass light through only a single aperture by rotating the blocking element such that the blocking element is associated with different apertures at different times and hence provides different illuminations at different times.

In either case, each of the corresponding cameras is exposed only when the corresponding aperture is allowed to receive light. The system shown in FIG. 4A shows a CCD camera assembly 430 receiving the light from the various apertures.

Figure 5:
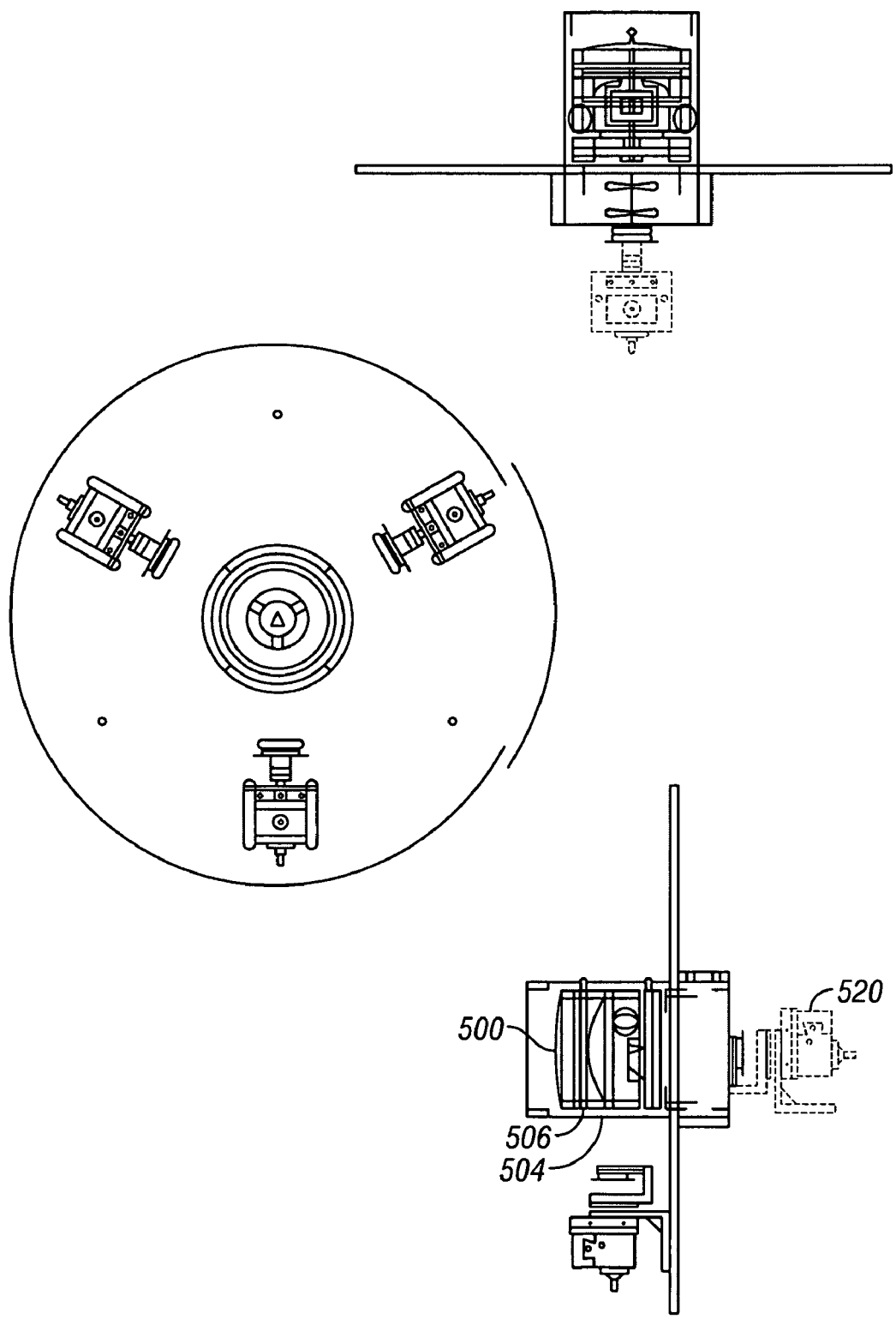
FIGS. 5 and 6 shows more detailed drawings of the optical relays of the camera shown in FIG. 4.
Figure 6:
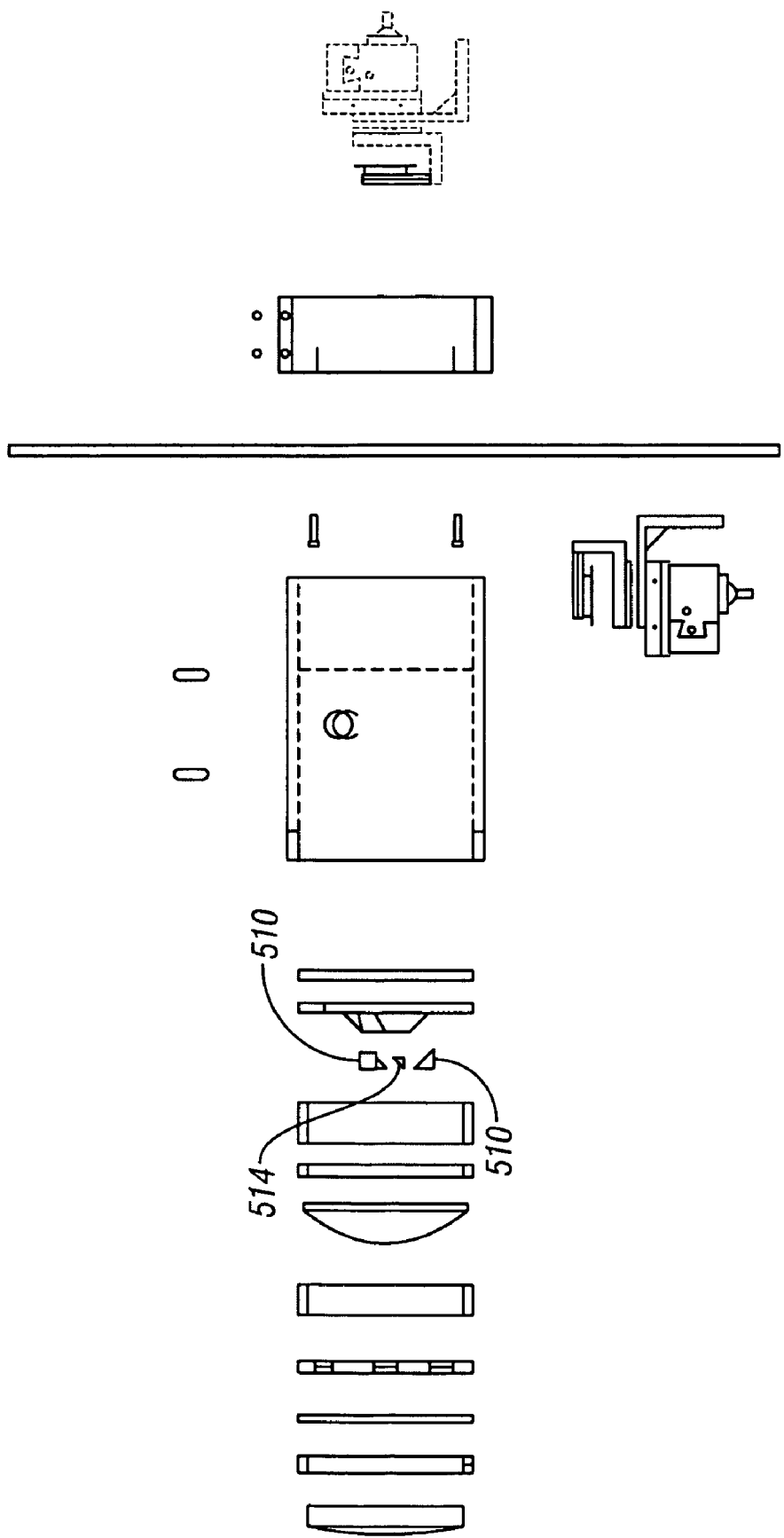

Another embodiment uses spacial filters to separate the different light values. FIG. 5 shows a preferred configuration of a spatially coded camera. The system includes a focusing lens assembly 500, 504, with an aperture system 506 between the two portions of the focusing lens 500, 504. An exploded view of the components is shown in FIG. 6. Each of the prisms 510, 512, 514 is directly located behind each aperture orifice. A three CCD camera 520 views the three images through the three aperture orifices, thereby providing three simultaneous views of the image.

The lenses within the focusing lens assembly 500, 504 direct the scattered light from the scene through each of the three orifices at 120° angles with each other. The light is then collected through the aperture orifices and directed to the separate CCD cameras. Each of the images on each of the three cameras is recorded simultaneously and then processed to provide three dimensional spacial locations of the points on the scene.

An alternative, but less preferred embodiment, uses three separate cameras, in place of the one camera described above.

The system as described and shown herein includes several advantages. The system allows superior camera alignment as compared with other competing images such as stereoscopic techniques. This system is also based on a defocusing technique as compared with stereoscopic techniques that require that the camera be focused on the area of interest. This system has significant advantages since it need not be focused on the area of interest, and therefore has fewer problems with trade offs between aperture size and other characteristics. (here)

Figure 7:
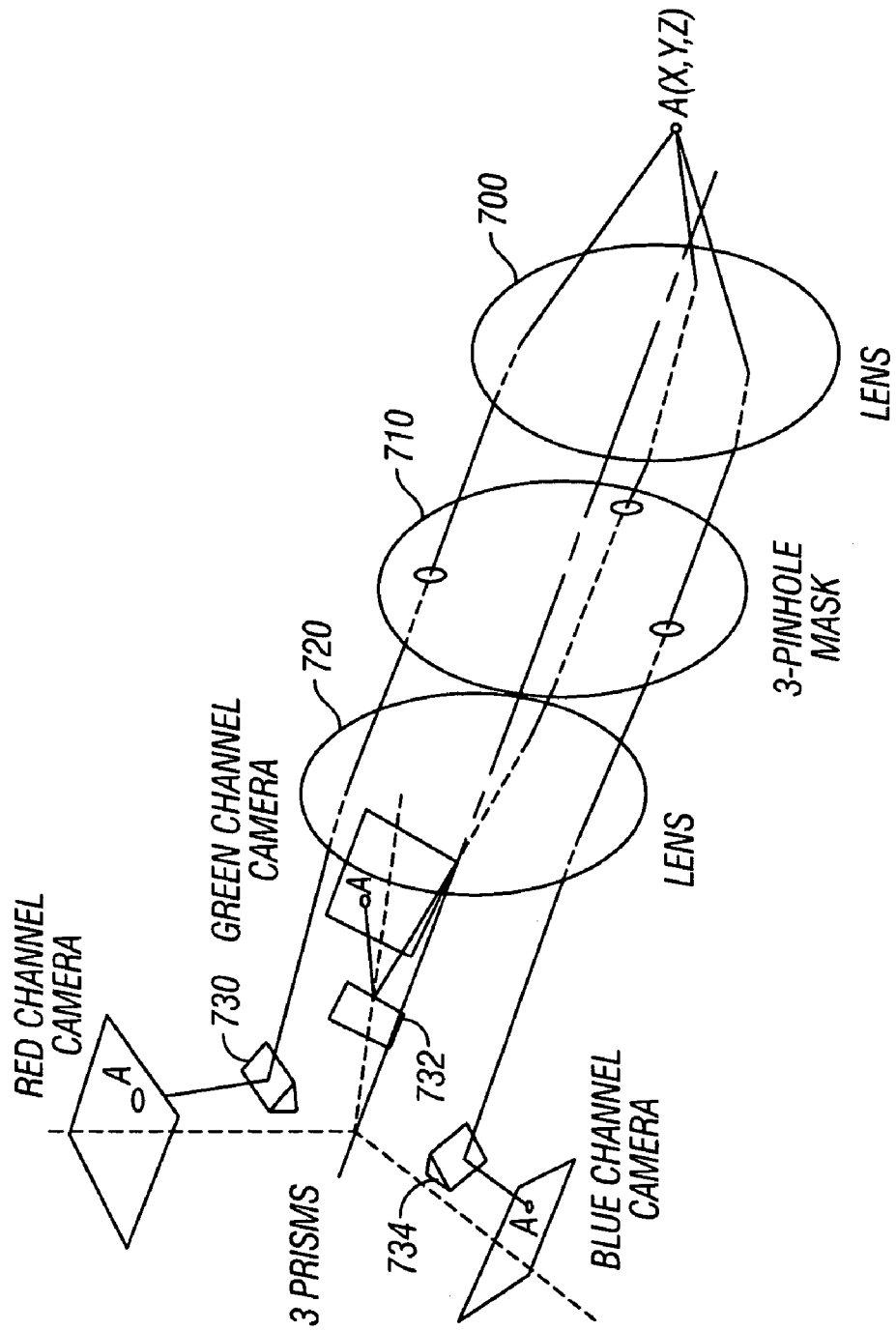
FIG. 7 is a schematic perspective view of the previously disclosed three-dimensional system, where one single lens is used with a three-aperture mask and a set of three separated cameras, each of which is associated with one aperture.

FIG. 7 shows a composite and changed version of this 3D camera using one single large lens 700 with a mask 710 with 3 apertures. This solution, depending on the application, may also require a lens assembly 720, where F#<1 (where F# is defined as f/d, where f is the lens' focal length, and d is the diameter of the lens). This latter lens may increase the cost of the assembly. In some embodiments, the lenses might need to be custom made.

In the FIG. 7 implementation, three prisms 730,730 to, 734 are used to redirect the light away from the optical axis of the camera. This may simplify the design.

Figure 8A:
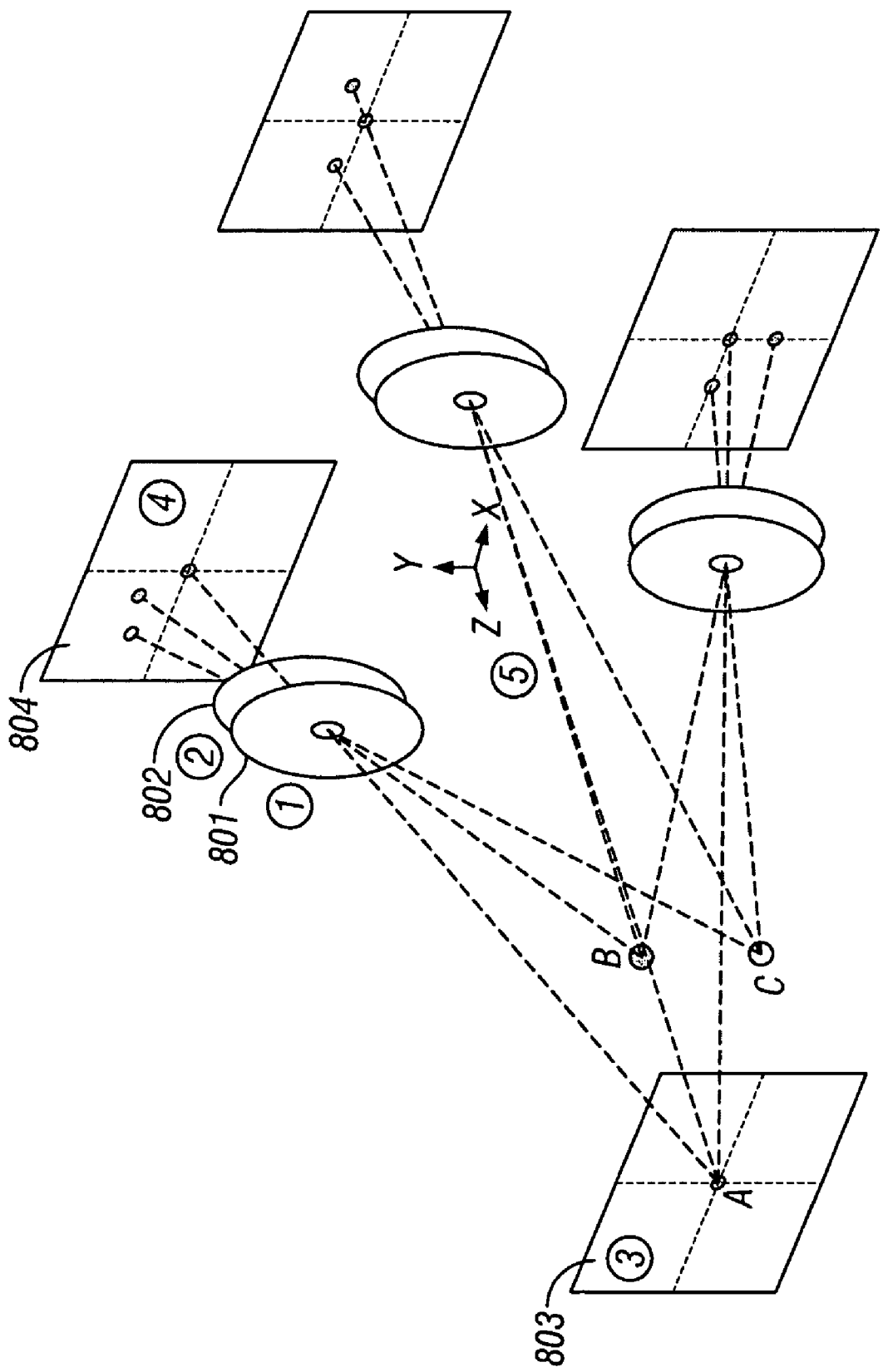
FIG. 8 is a schematic perspective view of the present invention where 3 lens-aperture sets are used in combination with a set of three separated cameras, each of which is associated to one lens-aperture set. The drawing shows how the pattern defined by the geometry of the lens-aperture system (an equilateral triangle in this case) changes with the position in space of the corresponding source point.
Figure 8B:
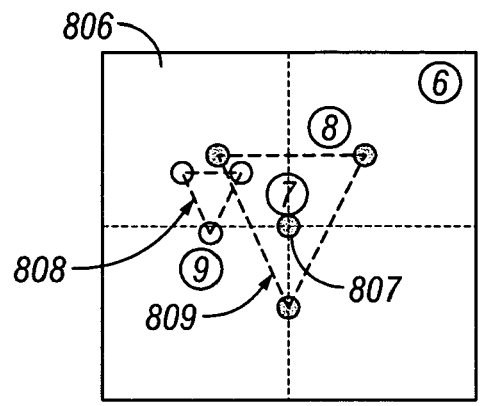

Another design is shown in FIG. 8. The camera in FIG. 8 is redesigned so that each photo sensor 804 has its own lens-aperture system 801, 802. Still, however, the global optical axis 805 of the camera is preserved and is unique. The system behaves as if we had replaced the original lens by a lens with infinite focal length. The use of small lenses 802 in front or behind the apertures 801 may also improve the collection of light as to produce small images on the imaging sensors 805, which allows the use of variable apertures and therefore allows to work in a wide range of lighting conditions. The flexibility of this lens assembly allows for more accurate 3D imaging, as no complex optics are used, thus minimizing the optical imperfections, making the manufacturing easier and the system ruggedized for field applications where environmental concerns are an important factor. Moreover, the geometrical parameters can be freely modified to match the specific requirements of the application, such as size of volume, depth resolution, etc The present embodiment preserves the same geometrical information as in the original design. In this arrangement, the 3 imaging sensors are arranged so that they form an equilateral triangle. FIG. 8B shows how a point A placed on the reference plane 803 is imaged as one unique image 807 on the combined imaged 806. Points B and C placed in between the lens-aperture plane and the reference plane will image as equilateral triangles 808 and 809, respectively. This is due to the fact that the 3 imaging sensors were arranged to form an equilateral triangle, thereby resulting in the equilateral triangles shown by 808 and 809. The size and the centroid of such triangles are directly related to the depth and plane location of the corresponding source point, respectively. It is understood that there would be such triangle patterns for any source point, each of them uniquely identifiable, making the invention suitable for the instantaneous mapping of large number of points, and consecutively suitable for real-time imaging of such sets at a frame rate defined either by the recording capabilities or by the dynamical system under observation. It is important to note that the arrangement of the 3 imaging sensors in the form of an equilateral triangle is not unique, and that any identifiable pattern could have been chosen.

This present invention allows for the 3 separate sensor/lens assemblies to be movable while maintaining the same geometric shape. For example, if the 3 sensor/lens sets are arranged so that they outline an equilateral triangle of a certain size, the 3 sensor/lens assemblies can be moved, thus allowing for visualizing smaller or larger volumes, in a manner that will preserve the equilateral triangle in their outline. Furthermore, the lens/pinhole assembly will be interchangeable to allow for imaging of various volume sizes. Such features will also allow the user to vary the working distance at their convenience.

Such improvements make the proposed system a new invention as it offers an improvement over the previous embodiments.

It is emphasized again that the choice of an equilateral triangle as the matching pattern, or equivalently of the number of apertures/imaging sensors (with a minimum of two), is arbitrary and is determined based on the needs of the user. It is also emphasized that the shape of the apertures is arbitrary and should only be defined by the efficiency in the collection of light and image processing. Furthermore, these apertures can be equipped with any type of light filters that would enhance any given features of the scene, such as the color. It is furthermore understood that the size of such apertures can be varied according to the light conditions, by means of any type of mechanical or electro-optical shuttering system. Finally, it is emphasized that the photo sensors can be of any sort of technology (CCD, CMOS, photographic plates, holographic plates . . . ) and/or part of an off-the-shelf system (movie cameras, analog or digital, high speed or standard frame rate, color or monochrome). This variety of implementations can be combined to map features like the color of the measured points (for example in the case of measuring a live face), their size, density, etc.

The invention will be presented in terms of the simplest implementation, which makes use of 2 lens-aperture sets. For this purpose, a simplified geometric model of a two-aperture defocusing optical arrangement is represented in FIG. 3. The interrogation domain is defined by a cube of side a. The back face of this cube is on the reference plane, which is placed at a distance L from the lens plane. The image plane is materialized by a photo sensor (e.g. CCD) of height h. Let d be the distance between apertures, f the focal length of the converging lens and l the distance from the lens to the image plane. The physical space is attached to a coordinate system originating in the lens plane, with the Z-axis on the optical axis of the system. Coordinates in the physical space are designated (X,Y,Z). The image coordinate system is simply the Z-translation of the physical system onto the sensor plane, i.e. at Z=−l. The coordinates of a pixel on the imaging sensor are given by the pair (x, y). Point P(X,Y,Z) represents a light scattering source. For Z<L, P is projected onto points P1(x'1, y'1) and P2(x'2,y'2), such that $$P_1 = \left\{ \begin{array}{l} x'_1 = \frac{M}{2Z}[d(L-Z) - 2LX] \\ y'_1 = -l\frac{Y}{Z} \end{array} \right\}$$

$$P_1 = \left\{ \begin{array}{l} x'_2 = \frac{M}{2Z}[-d(L-Z) - 2LX] \\ y'_2 = -l\frac{Y}{Z} \end{array} \right\}$$

where M is the magnification. The separation b of these images on the combined image (as in part 6 of FIG. 2 for a 3 lens-aperture system) is then defined by $$b\begin{pmatrix} b_x \\ b_y \end{pmatrix} = \begin{pmatrix} x'_1 - x'_2 \\ y'_1 - y'_2 \end{pmatrix}$$

$$b = \frac{Md}{Z}(L-Z)$$

Such definitions are identical to the previous formulation for the previous embodiments.

Figure 9:
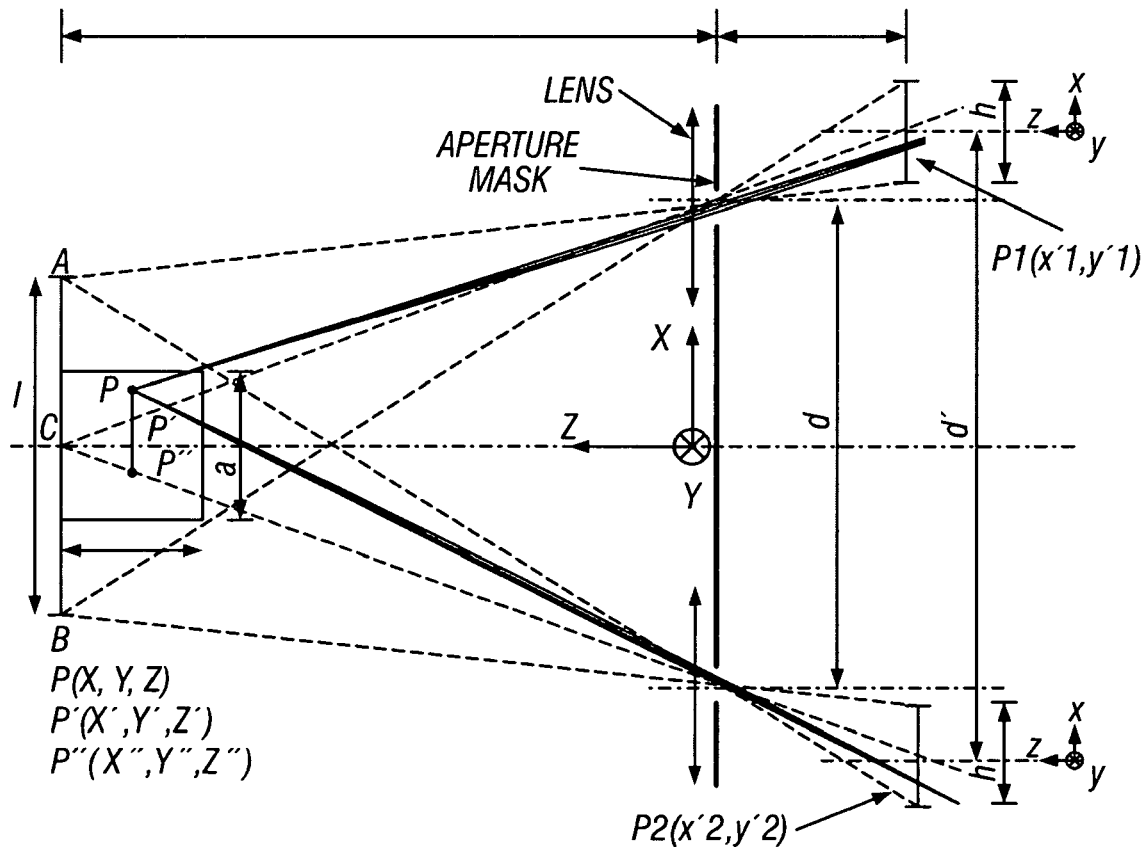
FIG. 9 is geometrical model of the present invention, using the 2-aperture arrangement for sake of clarity, and displaying all the parameters defining the optical principle of defocusing and upon which the present invention will be described in the following sections. The same parameters apply to a system with more than 2 lens-aperture systems.

FIG. 9 shows a geometric diagram of the aperture mask.

Figure 10:
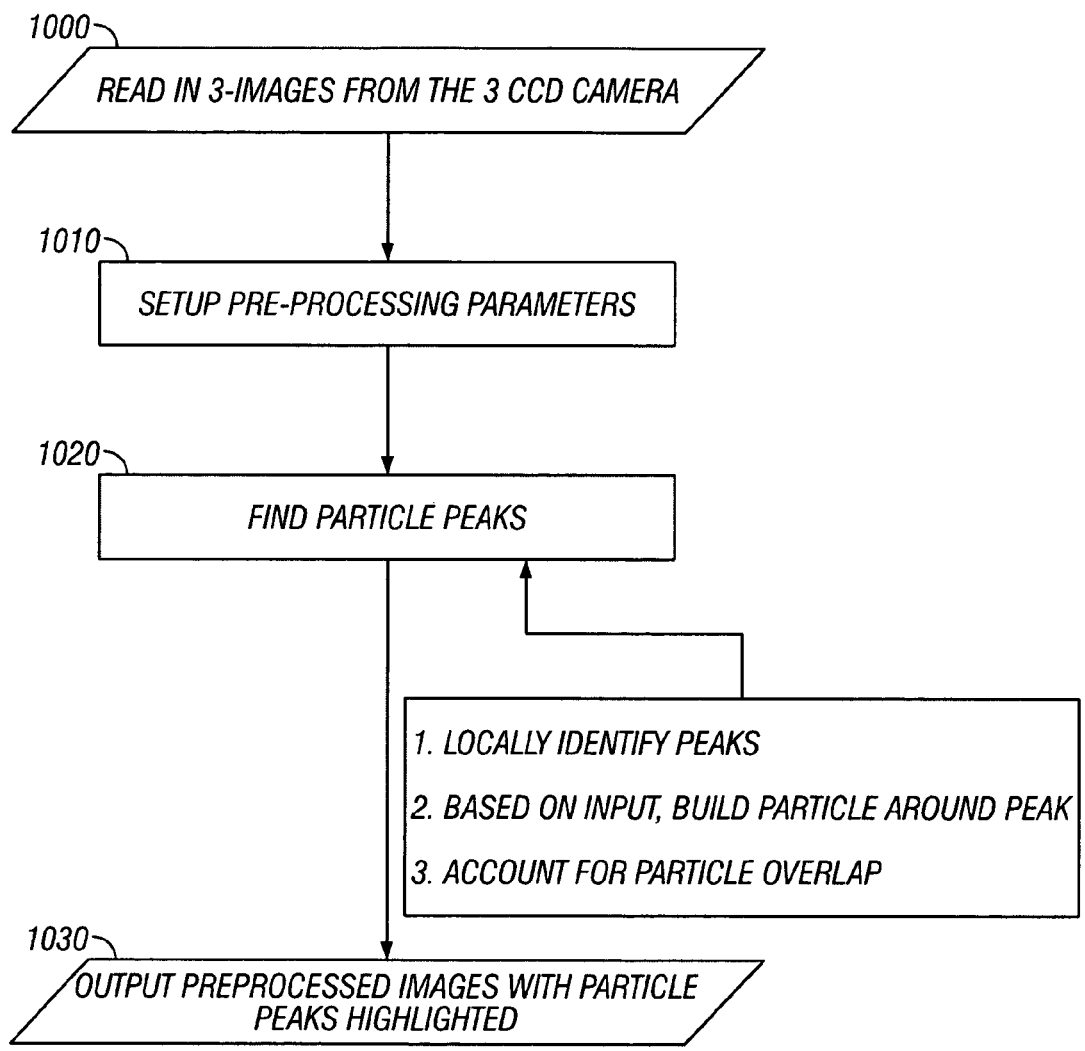
FIG. 10 is a flow diagram showing the sequence of program routines forming DE2PIV and used in the preprocessing of the combined images provided by a system with 3 lens-aperture sets.

The image and information that is obtained from this system may be processed as shown in the flowcharts of FIGS. 10-14. In FIG. 10, step 1000 defines reading in three images from the three CCD cameras of any of the previous embodiments. At 1010, preprocessing parameters may be set up which may be used for noise processing, and background image removal. Particle peaks are identified at 1020. These particle peaks may be identified by locally identifying peaks, building a particle around each peak, and then accounting for particle overlap. In this way, preprocessed peaks are obtained at 103, with the particle peaks being highlighted.

Figure 11:
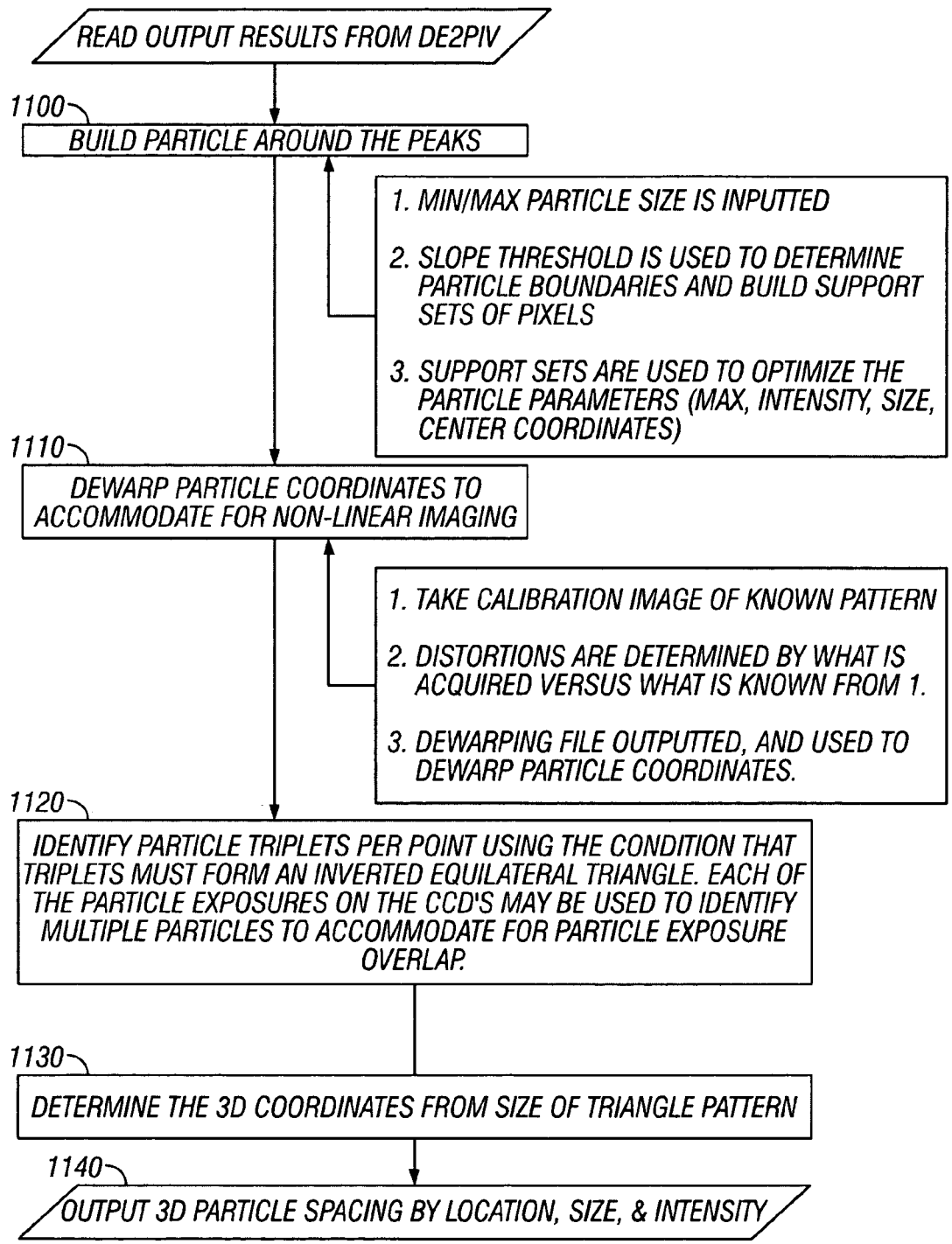
FIG. 11 is a flow diagram showing the sequence of program routines forming FINDPART and used in the image processing of the preprocessed images provided by DE2PIV. The program determines the three-dimensional coordinates of the scattering sources randomly distributed within a volume or on a surface.

These results are input to the second flowchart part, shown in FIG. 11. At 1100, a particle is built around the peaks, using the minimum and maximum particle size. A slope threshold is used to determine the particle boundaries, and to build support sets around the pixels. These support sets are used to optimize the particle parameters such as maximum, intensity, size and center coordinates. At 1110, the particle coordinates are "dewarped". This is done by using a calibration image of a known pattern. Distortions are determined by what is acquired as compared with what is known. The warped file is then output. The warping may thus accommodate for nonlinear imaging.

At 1120, particle triplets per point are identified. This may be done using the conditions that triplets must form an inverted equilateral triangle. Each of the particle exposures on the CCD's may be used to identify particles to accommodate for particle exposure overlap. At 1130, the three-dimensional coordinates are obtained from the size of the triangle pattern, and the 3-D particle spacing is output at 1140 based on location.

Figure 12:
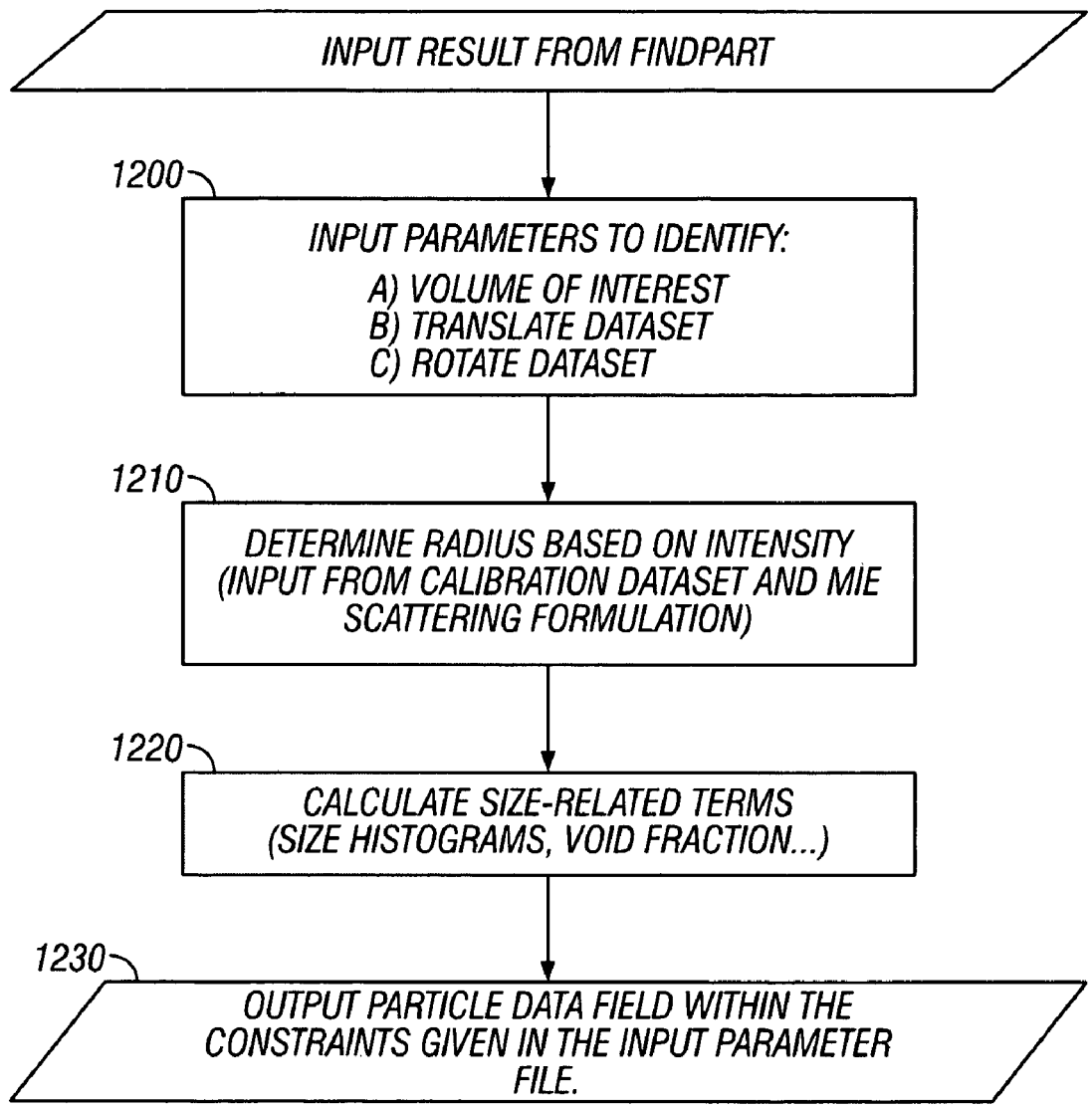
FIG. 12 is a flow diagram showing the sequence of program routines forming FILTERPART and used in the processing of the results provided by FINDPART. Operations such as volume-of-interest, source characterization, 3D geometrical operations, are possible.

In FIG. 12, the thsu obtained results are further processed at 1202 identify the volume of interest, to translate the data set, and to rotate the data set. A radius is determined at 1210 based on intensity as input from the calibration data set and the scattering formulation. The size related terms determined at 1220 such as size histograms and void fraction. At 1230, an output particle data field is obtained within the constraints given in the input parameter file.

Figure 13:
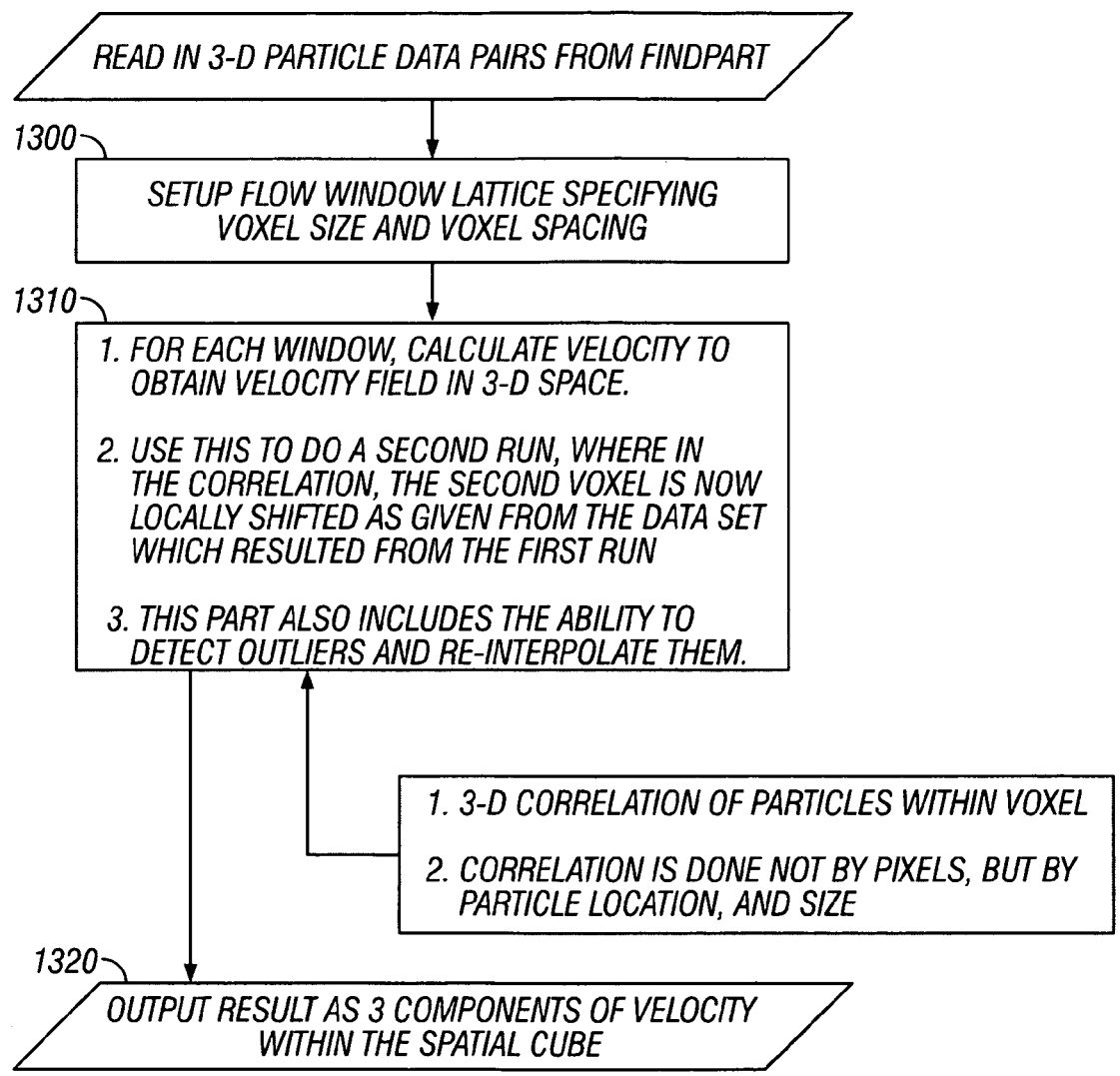
FIG. 13 is a flow diagram showing the sequence of program routines forming FINDFLOW and used in the processing of the results provided by FILTERPART. The program calculates the 3D displacement of the scattering sources as a function of time, i.e. the 3D velocity.

Three-dimensional particle data pairs are thus obtained and are fed to the flowchart of FIG. 13. In FIG. 13, at 1300, flow window lattice information is set up to specify Voxel size and Voxel spacing. For each window, the velocity is calculated in 3-D space at 1310. This may be done once or twice. In the second calculation, the second voxel may be locally shifted. This may be used to detect outliers and reinterpret those values. In general, this uses three-dimensional correlation of particles with in the Voxel. The correlation is not done by pixels, but rather by particle location and size. The results are output at 1320 as components of velocity within the spatial P2.

Figure 14:
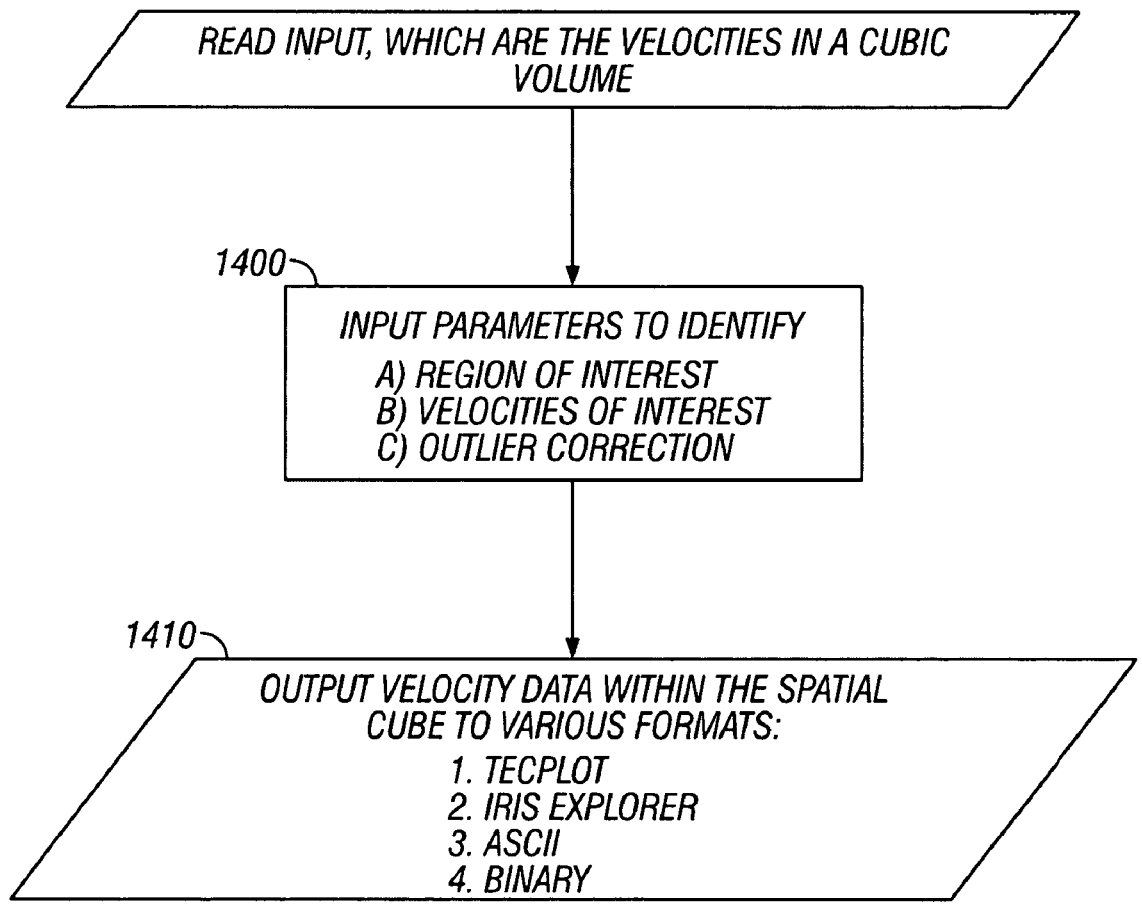
FIG. 14 is a flow diagram showing the sequence of program routines forming FILTERFLOW and used in the processing of the results provided by FINDFLOW. The program validates the results and outputs the data to various standard formats. Every dataset of scattering sources is characterized by a 3D vector field comprising the 3D coordinates of every source, the 3D velocity.

Filtering is carried out in FIG. 14. Again, the input parameters at 1400 may include a region of interest, velocities of interest, and outlier correction. The velocity data may be output into various formats at 1410.

Although only a few embodiments have been described in detail above, other embodiments are contemplated by the inventor and are intended to be encompassed within the following claims. In addition, other modifications are contemplated and are also intended to be covered. For example, different kinds of cameras can be used. The system can use any kind of processor or microcomputer to process the information received by the cameras. The cameras can be other types that those specifically described herein. Moreover, the apertures can be of any desired shape.

What is claimed:

1. A method, comprising:
    imaging a volume through a plurality of image apertures, arranged in a specified arrangement forming a geometric shape with 3 or more points such that object points in the volume are each imaged on at least one two dimensional image sensor as three or more corresponding image points, each image point corresponding to the object point and to one of the plurality of image apertures and the corresponding image points being arranged in a pattern geometrically similar to the geometric shape in which the image apertures are arranged; and
    determining information about a location of the object points in the volume using geometrical information based upon the location of each of the image points corresponding to each object point on the at least one two dimensional image sensor wherein said determining identifies the image points corresponding to an object point by finding the pattern geometrically similar to the geometric shape in which the image apertures are arranged.

2. A method as in claim 1, wherein said specified arrangement is an equilateral triangle, and said information about points comprises information about the equilateral triangle forming the image apertures, and information about an equilateral triangle formed from imaging each of said points.

3. A method as in claim 2, wherein said determining information comprises determining three-dimensional information about the points based on similarity of triangles.

4. A method as in claim 1, further comprising recognizing a pattern of said specified arrangement, to identify locations of source points.

5. A method as in claim 4, wherein said specified arrangement is an equilateral triangle, and said recognizing said specified arrangement comprises recognizing said equilateral triangle.

6. A method as in claim 4, further comprising allowing movement of said image apertures to allow visualizing a different size volume.

7. A method as in claim 1, wherein said image apertures include lenses.

8. A method as in claim 7, wherein said image apertures further include sensors associated with the lenses.

9. A method as in claim 1, wherein said plurality of image apertures includes two or more image apertures, and further comprising at least two image sensors each associated with one of said apertures.

10. A method as in claim 1, wherein said determining information comprises determining information using relations between similar triangles.

11. A method, comprising:
    imaging a volume through at least three image apertures, which image apertures are arranged in a specified geometrical arrangement forming a geometric shape with 3 or more points such that object points in the volume are each imaged on at least one two dimensional image sensor as three or more corresponding image points, each corresponding image point corresponding to the object point and to one of the plurality of image apertures and the corresponding image points being arranged in a pattern geometrically similar to the geometric shape in which the image apertures are arranged;
    locating particles within the volume based upon the location of each of the image points corresponding to each object point associated with the particles on the at least one two dimensional image sensor by recognizing said geometrical arrangement based upon the location of each of the image points corresponding to each object point on the at least one two dimensional image sensor by finding the pattern geometrically similar to the geometric shape in which the image apertures are arranged; and
    using a geometric relationship between the pattern geometrically similar to the geometric shape in which the image apertures are arranged and the specified arrangement to determine information about the particles.

12. A method as in claim 11, wherein said using information comprises building similar triangles to determine information about the particles.

13. A method as in claim 11, wherein said information comprises a velocity of a particle.

14. A method as in claim 11, wherein said specified arrangement is an equilateral triangle.

15. A method as in claim 11, wherein said image apertures include pinholes.

16. A method as in claim 11, wherein said image apertures include lenses.

17. A method, comprising:
    arranging a plurality of image apertures into a specified and recognizable geometric arrangement forming a geometric shape with 3 or more points;
    imaging a volume through the image apertures such that object points in the volume are each imaged on at least one two dimensional image sensor as three or more corresponding image points, each image point corresponding to the object point and to one of the plurality of image apertures and the corresponding image points being arranged in a pattern geometrically similar to the recognizable geometric arrangement in which the image apertures are arranged; and
    processing images received through each of said image apertures based upon the location of each of the image points corresponding to each object point on the at least one two dimensional image sensor to recognize said recognizable geometric arrangement, and to establish sets from said recognizable arrangement as points to be recognized.

18. A method as in claim 15, wherein said arrangement is a triangle arrangement, and further comprising using information about the triangle arrangement to establish information about points.

19. A method as in claim 18, wherein said information about the triangle arrangement comprises size and centroid of the triangles.

20. An apparatus, comprising:
a plurality of image apertures, arranged in a specified arrangement forming a geometric shape with 3 or more points;
a plurality of image sensors, each associated with an image aperture, and each obtaining an image from the associated image aperture such that object points are each imaged as three or more corresponding image points, each image point corresponding to the object point and to one of the plurality of image apertures and the corresponding image points being arranged in a pattern geometrically similar to the geometric shape in which the image apertures are arranged; and
a processor, operating to determine information about a location of the object points using geometrical information based upon the location of each of the image points corresponding to each object point on the plurality of image sensors wherein said determining identifies the image points corresponding to an object point by finding the pattern geometrically similar to the geometric shape in which the image apertures are arranged.

21. An apparatus as in claim 20, wherein said specified arrangement is an equilateral triangle, and said information about points comprises information about the equilateral triangle forming the image apertures, and information about an equilateral triangle formed from imaging each of said points.

22. An apparatus as in claim 21, wherein said processor determines three-dimensional information about the points based on similarity of triangles.

23. An apparatus as in claim 20, wherein said processor recognizes a pattern of said specified arrangement, to identify locations of the object points.

24. An apparatus as in claim 23, wherein said specified arrangement is an equilateral triangle, and said processor recognizes said equilateral triangle.

25. An apparatus as in claim 23, further comprising a movement part that moves said image apertures to allow visualizing a different size volume.

26. An apparatus as in claim 20, wherein said image apertures include lenses.

27. An apparatus, comprising:
at least three image apertures, which image apertures are arranged in a specified geometric arrangement forming a geometric shape with 3 or more points;
at least one two dimensional image sensor, receiving images that have passed through said apertures such that object points in the volume are each imaged on the at least one two dimensional image sensor as three or more corresponding image points, each image point corresponding to the object point and to one of the plurality of image apertures and the corresponding image points being arranged in a pattern geometrically similar to the geometric shape in which the image apertures are arranged; and
a processor, identifying particles within an imaged volume, by recognizing the pattern geometrically similar to the geometric shape in which the image apertures are arranged in a received image received on the at least one two dimensional image sensor, and using information about the specified arrangement and the relationship between the received image and the specified arrangement to determine information about the particles.

28. An apparatus as in claim 27, wherein said processor analyzes similarity of triangles in the specified geometric arrangement and the received image to determine information about the particles.

29. An apparatus as in claim 27, wherein said information comprises a location of a particle.

30. An apparatus as in claim 27, wherein said information comprises a velocity of a particle.

31. An apparatus as in claim 27, wherein said specified arrangement is an equilateral triangle.

32. An apparatus as in claim 27, wherein said image apertures include pinholes.

33. An apparatus as in claim 27, wherein said image apertures include lenses.

34. An apparatus, comprising:
a plurality of image apertures arranged into a specified and recognizable geometrical arrangement forming a geometric shape with 3 or more points;
a two dimensional image sensor, receiving images of a common volume through each of said plurality of image apertures such that object points in the volume are each imaged on the two dimensional image sensor as three or more corresponding image points, each image point corresponding to the object point and to one of the plurality of image apertures and the corresponding image points being arranged in a pattern geometrically similar to the geometric shape in which the image apertures are arranged; and
a processor, that processes said images received through each of said image apertures to recognize a geometric shape that is geometrically similar to said recognizable arrangement based upon the location of each of the image points corresponding to each object point on the two dimensional image sensors, and to establish sets from said recognizable arrangement as points to be recognized.

35. An apparatus as in claim 34, wherein said arrangement is a triangle arrangement, and wherein said processor uses information about the triangle arrangement and the relation between the triangle arrangement and the corresponding image points to establish information about said points.

36. An apparatus as in claim 35, wherein said information about the triangle arrangement comprises size and centroid of the triangles.

* * * * *

UNITED STATES PATENT AND TRADEMARK OFFICE
CERTIFICATE OF CORRECTION

| | | |
|---|---|---|
| PATENT NO. | : 7,612,869 B2 | Page 1 of 1 |
| APPLICATION NO. | : 11/365970 | |
| DATED | : November 3, 2009 | |
| INVENTOR(S) | : Pereira et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 411 days.

Signed and Sealed this

Nineteenth Day of October, 2010

David J. Kappos
*Director of the United States Patent and Trademark Office*

UNITED STATES PATENT AND TRADEMARK OFFICE
Certificate

Patent No. 7,612,869 B2                    Patented: November 3, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Francisco Pereira, Pasadena, CA (US); Darius Modarress, Rancho Palos Verdes, CA (US); Mory Gharib, San Marino, CA (US); Dana Dabiri, Altadena, CA (US); David Jeon, Los Angeles, CA (US); and Emilio Castano Graff, Pasadena, CA(US).

Signed and Sealed this Tenth Day of January 2012.

JOHN Q. NGUYEN
*Supervisory Patent Examiner*
Art Unit 3665
Technology Center 3600